(12) United States Patent
Vollmer et al.

(10) Patent No.: US 11,728,755 B2
(45) Date of Patent: Aug. 15, 2023

(54) METHOD FOR DETERMINING A ROTOR POSITION OF AN ELECTRIC ROTATING MACHINE, AND AN ELECTRIC ROTATING MACHINE FOR CARRYING OUT A METHOD OF THIS KIND

(71) Applicant: Robert Bosch GmbH, Stuttgart (DE)

(72) Inventors: Ulrich Vollmer, Weilheim (DE); Marco Roetzer, Epfendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/596,218

(22) PCT Filed: May 7, 2020

(86) PCT No.: PCT/EP2020/062706
§ 371 (c)(1),
(2) Date: Dec. 6, 2021

(87) PCT Pub. No.: WO2020/249329
PCT Pub. Date: Dec. 17, 2020

(65) Prior Publication Data
US 2022/0321044 A1 Oct. 6, 2022

(30) Foreign Application Priority Data
Jun. 12, 2019 (DE) ...................... 10 2019 208 497.4

(51) Int. Cl.
*H02P 23/14* (2006.01)
*H02P 27/08* (2006.01)

(52) U.S. Cl.
CPC .............. *H02P 23/14* (2013.01); *H02P 27/08* (2013.01)

(58) Field of Classification Search
CPC .......... H02P 2203/03; H02P 2203/052; H02P 27/00; H02P 27/04; H02P 27/06;
(Continued)

(56) References Cited

U.S. PATENT DOCUMENTS

2007/0132415 A1* 6/2007 Patel ...................... H02P 21/24
318/432

FOREIGN PATENT DOCUMENTS

DE 10 2009 039 672 A1 3/2011
DE 10 2016 205 462 A1 10/2017
(Continued)

OTHER PUBLICATIONS

International Search Report corresponding to PCT Application No. PCT/EP2020/062706, dated Jul. 14, 2020 German and English language document) (5 pages).

*Primary Examiner* — Antony M Paul
(74) *Attorney, Agent, or Firm* — Maginot, Moore & Beck LLP

(57) ABSTRACT

A method determines a rotor position of an electric rotating machine which is fed by a PWM-controlled inverter. Specific injection voltages, which are composed of predefined voltages and high-frequency voltages, are converted into corresponding PWM duty factors by a controller and the inverter is correspondingly actuated with these PWM duty factors. Current profiles of phase currents are then determined by measuring at least one first phase current and at least one second phase current. The measurement is carried out within a PWM period, in each case in the chronologically last third of a passive switched state. The rotor position is then determined in accordance with the ascertained current profiles and the fed-in high-frequency voltages.

9 Claims, 4 Drawing Sheets

(58) Field of Classification Search
CPC .......... H02P 27/08; H02P 27/085; H02P 6/00;
H02P 6/005; H02P 6/007; H02P 6/12;
H02P 6/14; H02P 6/16; H02P 6/18; H02P
6/183; H02P 6/28; H02P 6/32; H02P
7/00; H02P 7/29; H02P 21/00; H02P
21/0003; H02P 21/18; H02P 21/22; H02P
21/24; H02P 21/32; H02P 23/00; H02P
23/14; H02P 25/089; H02P 25/107; H02P
25/10; H02P 25/00; H02P 25/064; H02P
1/00; H02P 1/04; H02P 1/42; H02P 1/46;
H02P 1/24; H02P 1/26
See application file for complete search history.

(56) References Cited

FOREIGN PATENT DOCUMENTS

| | | |
|---|---|---|
| DE | 10 2017 210 071 A1 | 12/2018 |
| JP | H9-74787 A | 3/1997 |
| JP | 2002-281782 A | 9/2002 |
| JP | 2007-336641 A | 12/2007 |
| JP | 2010-172080 A | 8/2010 |

* cited by examiner

METHOD FOR DETERMINING A ROTOR POSITION OF AN ELECTRIC ROTATING MACHINE, AND AN ELECTRIC ROTATING MACHINE FOR CARRYING OUT A METHOD OF THIS KIND

This application is a 35 U.S.C. § 371 National Stage Application of PCT/EP2020/062706, filed on May 7, 2020, which claims the benefit of priority to Serial No. DE 10 2019 208 497.4, filed on Jun. 12, 2019 in Germany, the disclosures of which are incorporated herein by reference in their entirety.

BACKGROUND

The disclosure relates to a method for determining a rotor position of a rotating electric machine.

The invention relates to a method for determining a rotor position of a rotating electric machine.

Such a method is disclosed, for example, in the patent application DE 10 2009 039 672 A1. Here, an encoderless control system is disclosed which attempts to determine the rotor position without using a position sensor. So-called anisotropy-based methods are used at low speeds, which methods determine the rotor position via the magnetic anisotropy of the machine.

In highly dynamic drives, an inverter having pulse width modulation (PWM) is generally used to generate the adjustable phase voltage of the electric machines. The control signals of the inverter are calculated with the aid of space vector modulation, which converts the predetermined voltages ascertained by the control system into PWM duty factors. The PWM duty factors are typically output centered. The predetermined voltages are determined by the controller, for example, as a function of the rotor position and the detected phase currents, and certain requirements for the electric machine, for example, speed or torque.

In current anisotropy-based methods, a position-dependent change in current is produced by deliberately changing the predetermined voltages, in that high-frequency voltages are induced in addition to the voltages predetermined by the control system. The resulting change in current can then be detected by current measurements of the respective phase currents of the electric machine at specific points in time. The rotor position can then be determined as a function of the detected phase currents and the fed-in high-frequency voltages, as disclosed, for example, in the above-mentioned patent application.

SUMMARY

The disclosure relates to a method for determining a rotor position of a rotating, at least three-phase, electric machine fed by means of a PWM-controlled inverter. The procedure comprises the method steps:
a. determining injection voltages during a controller sampling period, wherein the injection voltages are composed of voltages predetermined by a controller for actuating the electric machine and additional high-frequency voltages,
b. determining PWM duty factors as a function of the injection voltages determined in method step a such that a passive switching state of the inverter ends in the middle of the PWM period and/or at the end of the PWM period,
c. actuating the inverter with the PWM duty factors determined in method step b in at least one PWM period after the controller sampling period in order to actuate the electric machine accordingly,
d. PWM-synchronous measuring of at least one first phase current and simultaneously a second phase current in order to obtain a current profile of all phase currents of the electric machine, the measuring taking place within the at least one PWM period in the last third of the passive switching state,
e. determining the rotor position as a function of the current profiles obtained in method step d and the fed-in high-frequency voltages in method step a.

An inverter is to be understood as meaning, for example, a B6 bridge, which in turn is made up of three half bridges. Each of the half bridges has a center tap for the corresponding phase of the electric machine and is each connected from the center tap to a positive and a negative potential via a semiconductor switch.

The injection voltages are determined by means of a controller. The injection voltages are composed of voltages predetermined by the controller for actuating the electric machine, which voltages generate a corresponding fundamental wave current, and additional high-frequency voltages. The fundamental wave current ensures the desired operation of the machine, for example, at a predetermined speed or also a predetermined torque. Furthermore, the high-frequency voltages can achieve a position-dependent change in current, wherein this change in current allows conclusions to be drawn about the rotor position of the electric machine.

In this context, the controller sampling period is to be understood as the time duration between two controller sampling steps which are used to determine the injection voltages to be applied to the electric machine. A controller sampling period can be selected to be greater than a PWM period duration, as a result of which a plurality of PWM periods fall into one controller sampling period.

The inverter is actuated in at least one PWM period after the controller sampling period with the previously determined PWM duty factors. This actuation period then already falls under the next controller sampling period, during which the injection voltages for connection to this controller sampling period are determined on the basis of the phase currents measured in this controller sampling period.

Simultaneous measurement of the phase currents can be understood to mean that the currents are sampled at the same point in time. Wherein the sampling times can differ minimally from one another due to measurement tolerances or the like and still fall under the term "simultaneously".

The passive switching state is understood to mean that all phases of the electric machine are at the same potential and are consequently short-circuited. The opposite of this is accordingly an active switching state. Such a passive switching state ends as soon as the voltage of at least one of the phases at the same potential is switched.

A change in the magnetic flux in the electric machine over time induces eddy currents in the electrically conductive materials of this machine. At low speeds, the magnetic fluxes change mainly in active switching states in which different phases are connected to different potentials of the inverter. The eddy currents in the electric machine have the effect that each phase current contains a current component that does not contribute to the magnetic flux formation. This is due to the fact that both the phase current and the eddy currents generate a magnetic flux. These two flow components work in opposite directions and thus partially cancel each other out. If the eddy currents have decayed, the non-flux-forming current component is negligibly small.

In time segments in which the phases of the electric machine are short-circuited, on the other hand, the change in the magnetic fluxes in the electric machine is very small. The eddy currents therefore decay in these time segments.

Furthermore, the eddy currents are strongly temperature-dependent.

A value below 10% of the rated speed of the electric machine can be regarded as a low speed. If the speed is higher, a classic fundamental wave-based method can be used to determine the rotor position.

The advantage here is that the PWM duty factors can be determined such that a phase current measurement can be carried out at a point in time at which the eddy currents have almost or even completely decayed. This allows errors in the determination of the rotor position due to such eddy currents to be minimized. Particularly with an anisotropy-based method of this type, small deviations in the measured phase current can lead to serious errors when determining the rotor position. This is particularly true because the change in current due to the fed-in high-frequency voltages is small and therefore the eddy currents cannot be neglected in relation to the change in current caused by the high-frequency voltages.

Furthermore, the temperature dependency of the method can be reduced. p The anisotropy-based method enables, particularly, an encoderless determination of the rotor position, which only negligibly worsens the properties of the electric machine during operation. In addition, it is also possible according to the disclosure for the result of an existing rotor position sensor to be validated by the method.

In one embodiment of the method according to the disclosure, it is provided that in method step d, at least the first phase current and the second phase current are each measured at the end of the passive switching state. The advantage here is that the eddy currents have already decayed as much as possible at the end of the passive switching state.

According to one embodiment of the method according to the disclosure, it is provided that in method step b, the PWM duty factors are determined such that a time duration of the passive switching state during which measurements are to be made in method step d is maximally long.

In one embodiment of the method according to the disclosure, it is provided that in method step b, the PWM duty factors are determined such that a passive switching state ends in the middle of the PWM period and at the end of the PWM period, and that in method step d, at least the first phase current and the second phase current are measured once per passive switching state within the PWM period.

The advantage here is that the rotor position can be determined more precisely, since a plurality of phase current measured values are present per PWM period.

According to one embodiment of the method according to the disclosure, it is provided that in method step b, the PWM duty factors are determined such that the time durations of the two passive switching states during which measurements are to be made in method step d are essentially the same size.

Essentially, a deviation of a few percent is to be understood here, which is due, for example, to external interferences or manufacturing-related tolerances.

The advantage here is that the eddy currents can decay equally strongly in both passive switching states in order to obtain a uniform result in the phase current measurement. In addition, the two passive switching states can be selected such that once all phases are connected to the positive potential and once all phases are connected to the negative potential. If the time durations of the two passive switching states are now the same size, an intermediate circuit capacitor of the inverter is loaded as little as possible.

According to one embodiment of the method according to the disclosure, it is provided that in method step b, the PWM duty factors are determined such that positive PWM pulses of the PWM duty factors for all phases within the at least one PWM period have a common, vertical axis symmetry.

The advantage here is that the load on an intermediate circuit capacitor or the intermediate circuit capacitors of the inverter is reduced.

According to one embodiment of the method according to the invention disclosure, it is provided that in method step b, the PWM duty factors are determined such that a time duration between the ends of two successive passive switching states, during which at least the first phase current and the second phase current are to be measured, is constant. The advantage here is that a constant sampling frequency of the phase currents is achieved, wherein this constant sampling frequency simplifies the anisotropy-based method and thus simplifies the determination of the rotor position.

According to one embodiment of the method according to the disclosure, it is provided that in method step d, at least the first phase current and the second phase current are measured by means of at least one current sensor for each phase to be measured and by means of at least one analogue-digital converter, wherein the analogue-digital converter is designed such that a measurement of the phase currents is made possible in each case at a predetermined point in time, wherein the analogue-digital converter is particularly an SAR analogue-digital converter.

The advantage here is that this enables the respective phase current to be determined easily and precisely. In particular, the SAR-AD converter can be used to sample the phase current at any point in time. An AD converter can be used here for all phases by means of a multiplexer or a separate AD converter can also be used for each phase.

The disclosure also relates to an electric, rotating, at least three-phase machine and fed by means of a PWM-controlled inverter, which machine is designed to carry out a method according to the disclosure.

The advantage here is that errors due to eddy currents can be minimized when determining the rotor position of the electric machine. Furthermore, temperature dependency can be reduced in this determination.

DETAILED DESCRIPTION

Figure 1:
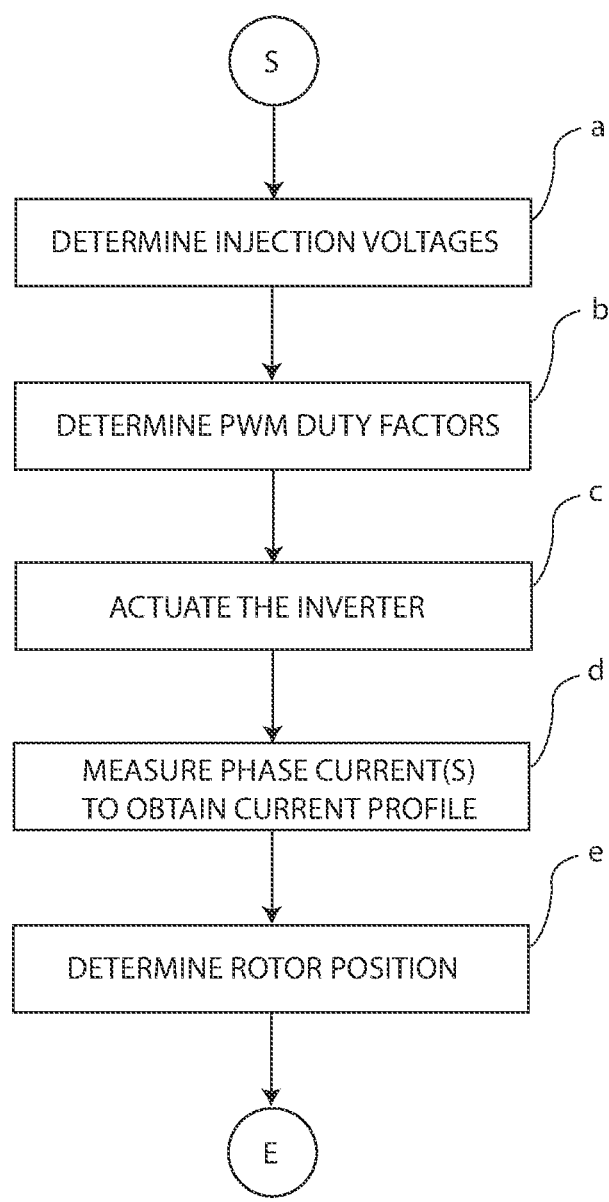
FIG. 1 shows an exemplary embodiment of a method according to the disclosure for determining a rotor position of an electric rotating machine.

FIG. 1 shows an exemplary embodiment of a method according to the disclosure for determining a rotor position of an electric rotating machine. The electric machine 10, for example, according to FIG. 2, has a winding group 30 and a PWM-controlled inverter 40 for feeding the winding group 30.

In the method shown in the exemplary embodiment according to FIG. 1, after the start S, injection voltages $u_{inj}$ are determined in a method step a during a controller sampling period, wherein the injection voltages $u_{inj}$ are composed of voltages $u_{control}$ and additional high-frequency voltages $u_{hf}$ predetermined by a controller 50 for actuating the electric machine 10. The duration of the controller sampling period and thus the duration between the first controller sampling step and the second controller sampling step can particularly be selected such that it is many times greater than a PWM period duration $T_{PWM}$.

Subsequent to method step a, in a method step b, PWM duty factors are determined as a function of the injection voltages $u_{inj}$ determined in method step a such that a passive switching state ends in the middle of the PWM period $t_{PWM,M}$ and/or at the end of the PWM period $t_{PWM,E}$. For this purpose, a PWM unit 70 converts the determined injection voltages $u_{inj}$ into PWM duty factors.

Subsequently, in a method step c, the inverter 40 is actuated with the PWM duty factors determined in method step b in at least one PWM period after the controller sampling period in order to actuate the electric machine 10 accordingly.

Then, in a method step d, at least one first phase current $i_a$ and one second phase current $i_b$ are each PWM-synchronously measured simultaneously in order to obtain a current profile of all phase currents $i_a$, $i_b$, $i_c$, wherein the measurement within the at least one PWM period takes place in the last third of a passive switching state. In particular, the phase currents $i_a$, $i_b$ are measured at the end of the respective passive switching state. The measurement also takes place between two controller sampling steps, that is, during a controller sampling period which follows the controller sampling period of method step a.

If, for example, only the first phase current $i_a$ and the second phase current $i_b$ are measured in a three-phase electric machine 10, a third phase current $i_c$ can thus be determined from the first phase current $i_a$ and the second phase current $i_b$ using Kirchhoff's first law:

$$i_c = -i_a - i_b$$

Alternatively, the third phase current $i_c$ can also be measured.

Finally, in a method step e, the rotor position of the electric machine 10 is determined as a function of the current profiles obtained in method step d and the fed-in high-frequency voltages $u_{hf}$, and the method is then ended. The rotor position can particularly be determined by determining the change in current which is produced by changing the predetermined voltage $u_{control}$ in method step a. The change in current is determined as a function of the current profiles of the phase currents $i_a$, $i_b$, $i_c$ obtained in method step d and the fed-in high-frequency voltages $u_{hf}$. For this purpose, the current profiles obtained in method step d are divided into a first current, which would flow without changing the predetermined voltages $u_{control}$, and a second current, which is generated by changing the predetermined voltages $u_{control}$. The second current can be determined, for example, by forming a difference between the phase currents $i_a$, $i_b$, $i_c$ obtained in method step d. Furthermore, the first current can be determined, for example, by forming an average value of the phase currents $i_a$, $i_b$, $i_c$ obtained in method step d.

In an alternative exemplary embodiment, not shown, the method can be restarted regularly in order to continuously determine the rotor position of the electric machine.

Figure 2:
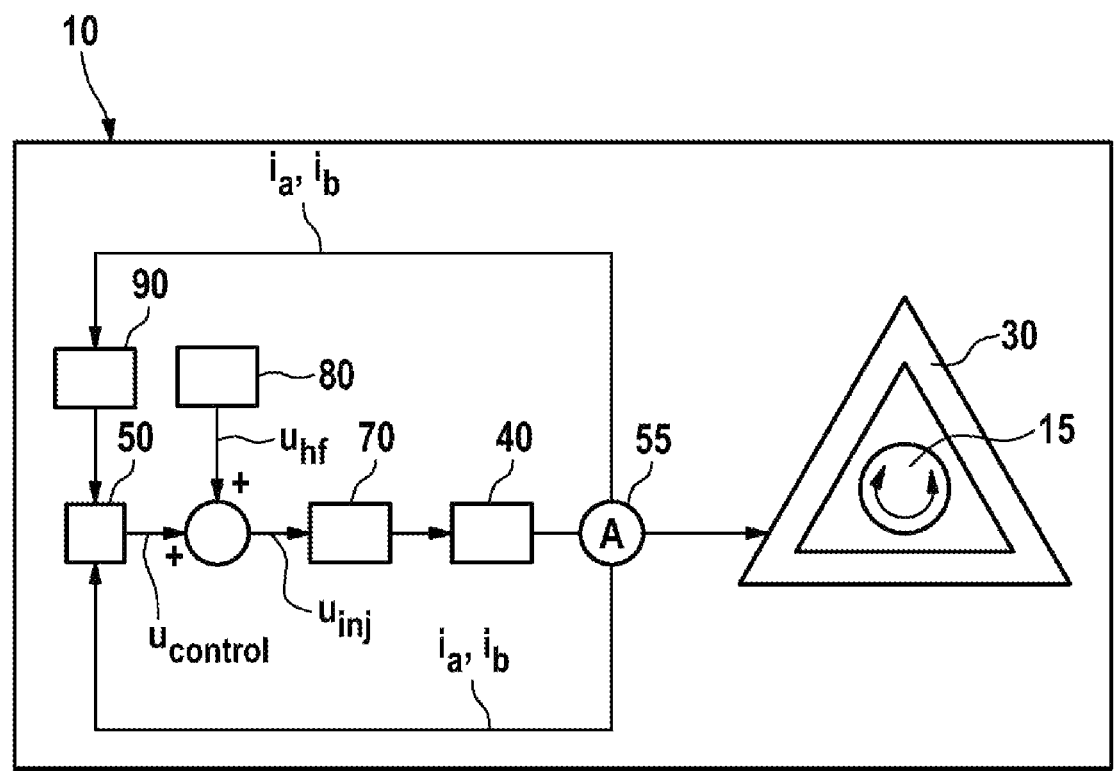
FIG. 2 shows an exemplary embodiment of an electric rotating machine according to the disclosure, which is designed to carry out a method according to the disclosure.

FIG. 2 shows an exemplary embodiment of an electric rotating machine according to the disclosure, which is designed to carry out a method according to the disclosure.

An electric machine 10 is shown. The electric machine 10 has a permanent magnetic rotor 15 which is surrounded by a winding group 30. The electric machine 10 is designed particularly to be three-phase, but this is not shown in the figure. The winding group 30 is arranged on a stator (not shown).

Furthermore, the winding group 30 is connected to an inverter 40, which energizes the winding group 30 and which can be designed, for example, as a B6 bridge. The inverter 40 is in turn connected to a PWM unit 70 which actuates the inverter 40. Here, the PWM unit 70 receives predetermined voltages $u_{control}$ from a controller 50 and high-frequency voltages $u_{hf}$ from a high-frequency excitation unit 80, which are added to the predetermined voltages $u_{control}$ and then converted as injection voltages $u_{inj}$ by the PWM unit 70 into corresponding PWM duty factors.

The electric machine 10 has a current sensor 55 each for at least a first phase and a second phase, wherein only one current sensor 55 is shown as an example. A corresponding phase current $i_a$, $i_b$, $i_c$ can in each case be sampled by means of this current sensor 55. In addition, the electric machine 10 also has an analogue-digital converter, which is not shown here, but is integrated into the current sensor 55. The analogue-digital converter is designed particularly such that the phase currents $i_a$, $i_b$ can be measured at a predetermined point in time, wherein the analogue-digital converter is particularly an SAR analogue-digital converter. The current sensor 55 can be designed, for example, as a measuring resistor or as a Hall sensor.

The values of the detected phase currents $i_a$, $i_b$, $i_c$ are made available both to the controller 50 and to a rotor position unit 90. The rotor position unit 90 is designed to determine a rotor position of the rotor 15 as a function of the corresponding current profiles of the phase currents $i_a$, $i_b$, $i_c$ and the high-frequency voltages $u_{hf}$ and to transmit this rotor position to the controller 50, among other things. The controller 50 is designed to determine the predetermined voltages $u_{control}$ as a function of the current profiles of the phase currents $i_a$, $i_b$, $i_c$ and the obtained rotor position. These predetermined voltages $u_{control}$ are then added to the high-frequency voltages $u_{hf}$ and the sum is transmitted to the PWM unit 70 as certain injection voltages $u_{inj}$, as already described above.

Figure 3A:
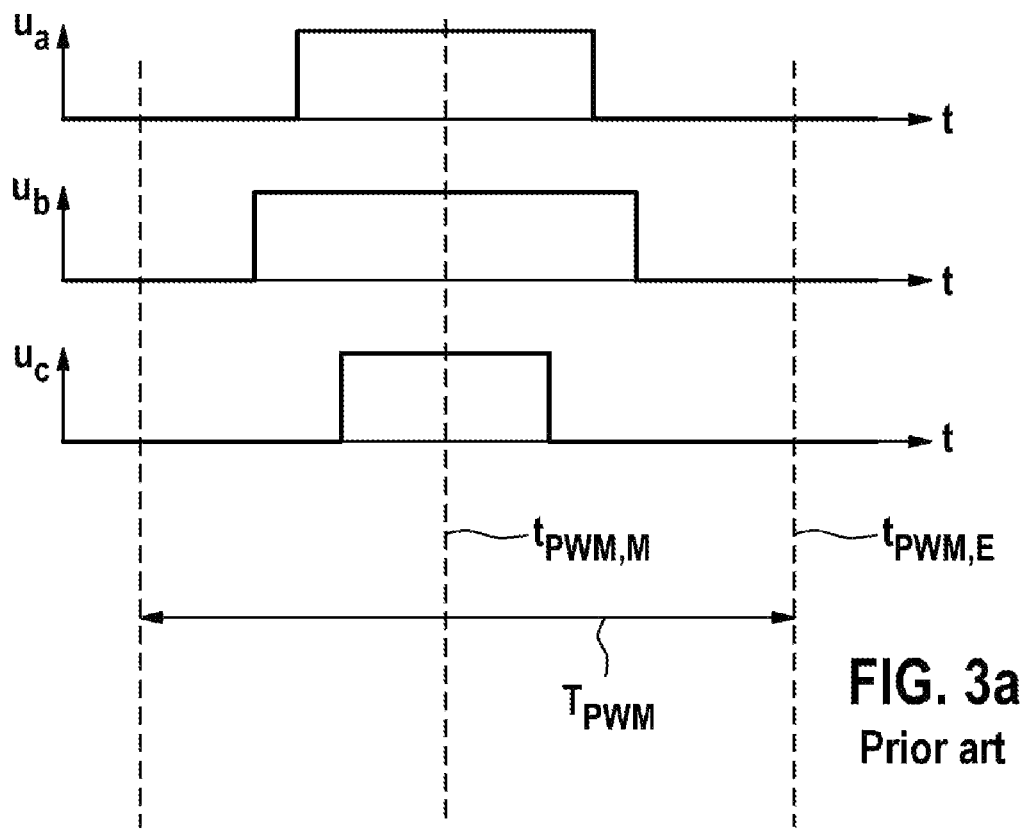
FIGS. 3a to 3d show different possibilities of certain PWM duty factors. A centered PWM from the prior art is shown in FIG. 3a. In contrast, PWM duty factors according to the disclosure are shown in FIGS. 3b to 3d.
Figure 3B:
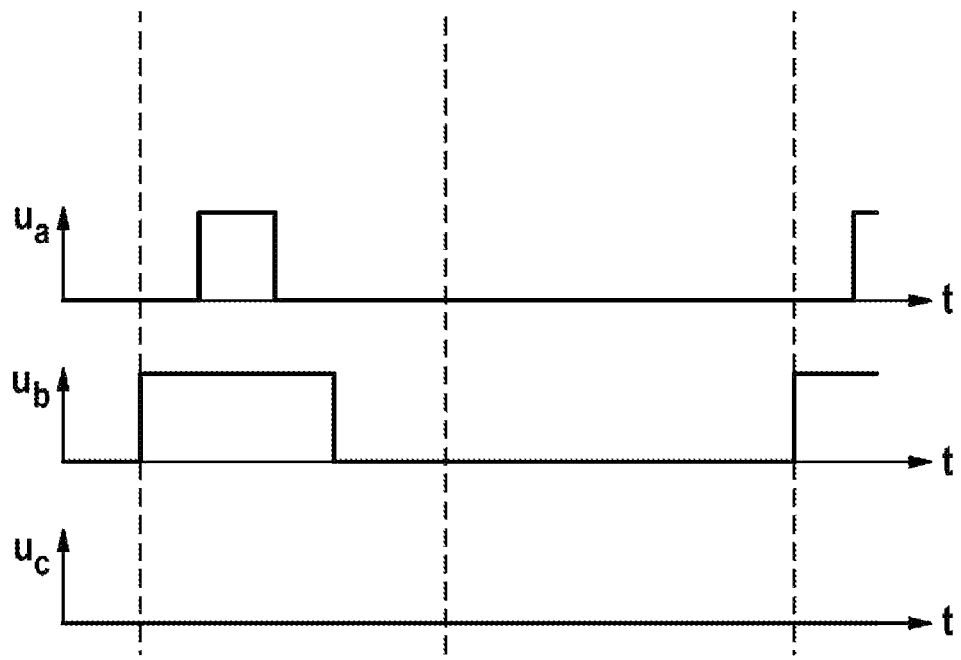
Figure 3C:
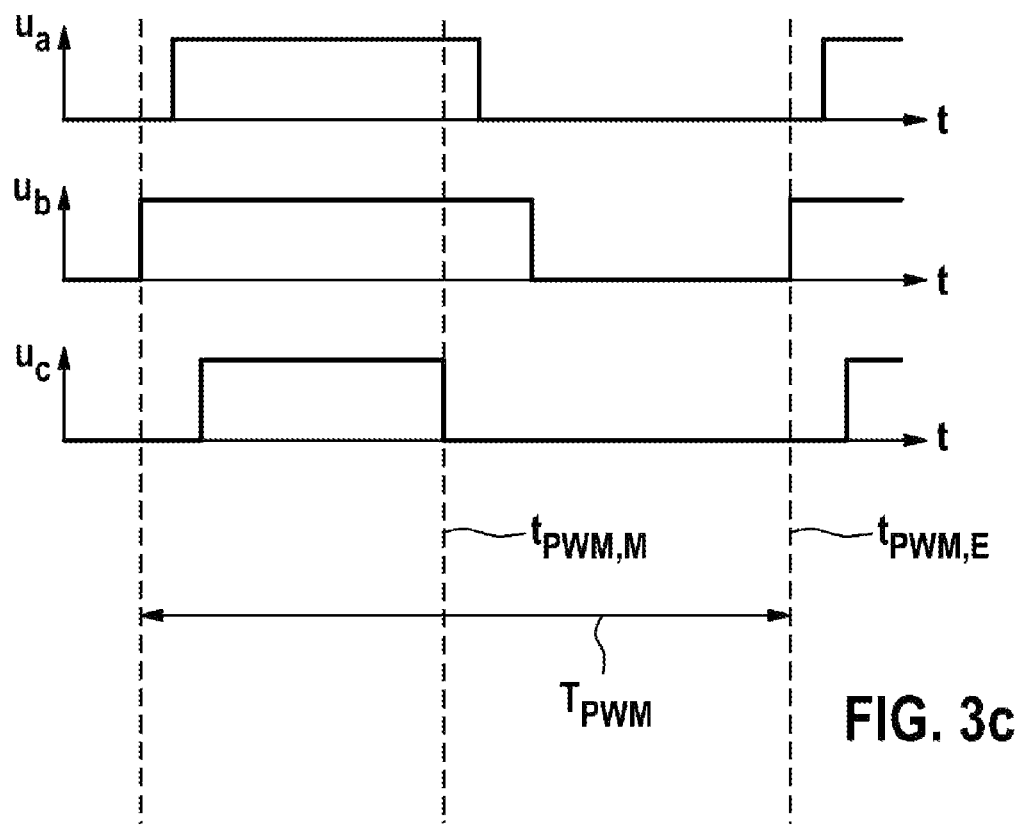
Figure 3D:
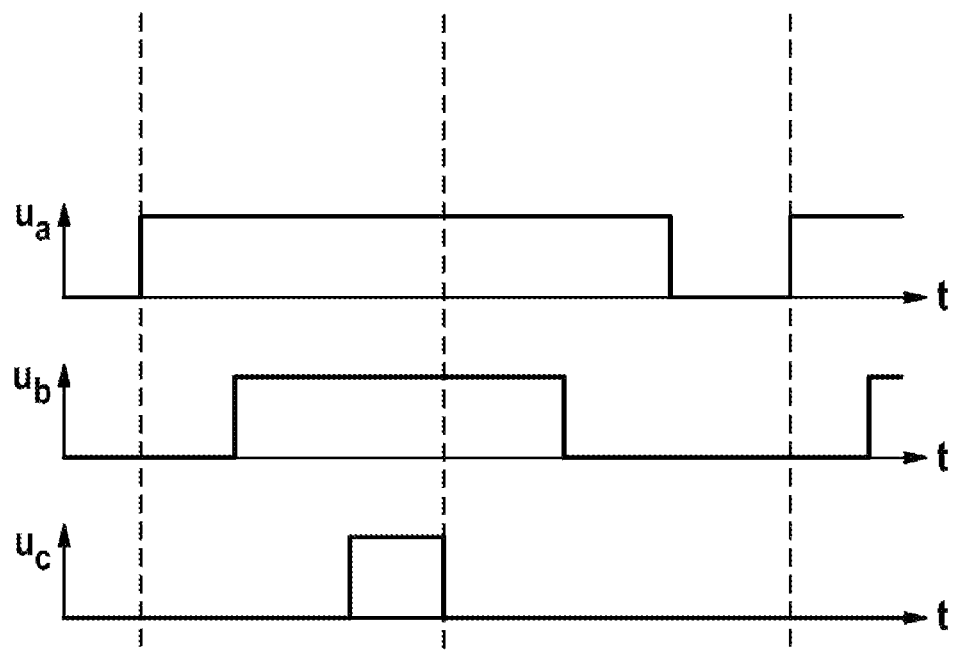

FIGS. 3a to 3d show different possibilities of certain PWM duty factors. A centered PWM from the prior art is shown in FIG. 3a. In contrast, PWM duty factors according to the disclosure are shown in FIGS. 3b to 3d.

A centered PWM from the prior art is shown in FIG. 3a. An entire PWM period having a PWM period duration $T_{PWM}$ and the end of the previous and the beginning of the following PWM period are shown. The PWM duty factors of the individual phase voltages $u_a$, $u_b$ and $u_c$ are shown here over time t and selected centered on the middle of the PWM period $t_{PWM,M}$. The phase currents $i_a$, $i_b$, $i_c$ are typically measured in the middle of the PWM period $t_{PWM,M}$ and/or at the end of the PWM period $t_{PWM,E}$.

In FIG. 3b, PWM duty factors are shown by way of example which have only one passive switching state per PWM period duration $T_{PWM}$, wherein this passive switching state ends at the end of the PWM period $t_{PWM,E}$. Appropriately determining the PWM duty factors selects a maximum time duration of the passive switching state, particularly, wherein the injection voltages $u_{inj}$ determined by the controller 50 are achieved.

The first and second phase currents $i_a$, $i_b$ can then be detected within the last third of the passive switching state in which eddy currents that have occurred due to the injection voltages $u_{inj}$ being fed in according to the PWM duty factors have already decayed. Particularly, a phase current measurement takes place at the end of the PWM period $t_{PWM,E}$ so that the eddy currents have decayed as much as possible. Furthermore, it can be seen that the positive PWM pulses of the PWM duty factors for all phases within the at least one PWM period have a common, vertical axis symmetry.

On the other hand, FIGS. 3c and 3d show PWM duty factors which have two passive switching states per PWM period duration $T_{PWM}$. A first passive switching state here ends in the middle of the PWM period $t_{PWM,M}$ and a second passive switching state ends at the end of the PWM period $t_{PWM,E}$. The phase currents $i_a$, $i_b$ here can then be measured twice per PWM period within the last third of the respective passive switching state, but particularly once in the middle of the PWM period $t_{PWM,M}$ and once at the end of the period $t_{PWM,E}$ and thus at the respective end of the passive switching state. Due to the corresponding determination of the PWM duty factors, the time durations of the two passive switching states are, particularly, essentially the same size.

Furthermore, it can also be seen here that the positive PWM pulses of the PWM duty factors for all phases within the at least one PWM period have a common, vertical axis symmetry.

Particularly, the PWM duty factors are also chosen such that a time duration between the ends of two successive passive switching states, during which at least the first phase current $i_a$ and the second phase current $i_b$ are to be measured, is constant and a constant sampling frequency for the phase current measurement can thus be achieved. For this purpose, the points in time of the successive phase current measurements must of course also be selected accordingly.

The invention claimed is:

1. A method for determining a rotor position of a rotating, at least three-phase, electric machine operably connected to a PWM pulse width modulated (PWM)-controlled inverter, the method comprising :
    determining injection voltages during a controller sampling period, the injection voltages composed of (i) voltages predetermined by a controller for actuating the electric machine, and (ii) additional high-frequency voltages;
    determining PWM duty factors as a function of the determined injection voltages, such that a passive switching state ends in a middle of a PWM period and/or at an end of the PWM period;
    actuating the inverter with the determined PWM duty factors in at least one PWM period after the controller sampling period in order to actuate the electric machine accordingly;
    conducting PWM-synchronous measuring of at least one first phase current and simultaneously a second phase current in order to obtain a current profile of all phase currents of the electric machine, the measuring taking place within the at least one PWM period in a last third of the passive switching state; and
    determining the rotor position as a function of the obtained current profiles and the additional high-frequency voltages.

2. The method according to claim 1, the conducting the PWM-synchronous measuring comprising:
    measuring at least the at least one first phase current and the second phase current at the end of the passive switching state.

3. The method according to claim 1, the determining PWM duty factors comprising:
    determining the PWM duty factors such that a time duration of the passive switching state during which the measurements are to be made during the conducting the PWM-synchronous measuring is maximally long.

4. The method according to claim 1, wherein:
    the determining the PWM duty factors comprises determining the PWM duty factors such that a first passive switching state ends in the middle of the PWM period and a second passive switching state end at the end of the PWM period, and
    the conducting PWM-synchronous measuring comprises measuring at least the first phase current and the second phase current once per passive switching state within the PWM period.

5. The method according to claim 4, the determining PWM duty factors comprising:
    determining the PWM duty factors such that time durations of the two passive switching states during which measurements are to be made during the conducting the PWM-synchronous measuring are essentially the same size.

6. The method according to claim 1, the determining PWM duty factors comprising:
    determining the PWM duty factors such that positive PWM pulses of the PWM duty factors for all phases within the at least one PWM period have a common vertical axis symmetry.

7. The method according to claim 1, the determining PWM duty factors comprising:
    determining the PWM duty factors such that a time duration between the ends of two successive passive switching states, during which at least the first phase current and the second phase current are to be measured, is constant.

8. The method according to claim 1, the conducting the PWM-synchronous measuring comprising:
    measuring at least the first phase current and the second phase current using (i) at least one current sensor for each phase to be measured, and ii) at least one analog to digital converter,
    wherein the analog to digital converter is configured to measure the phase currents in each case at a predetermined point in time, and
    wherein the analog to digital converter includes a successive approximation register (SAR) analogue-digital converter.

9. The method according to claim 1, wherein the electric machine is configured to carry out the method.

* * * * *

UNITED STATES PATENT AND TRADEMARK OFFICE
CERTIFICATE OF CORRECTION

| | |
|---|---|
| PATENT NO. | : 11,728,755 B2 |
| APPLICATION NO. | : 17/596218 |
| DATED | : August 15, 2023 |
| INVENTOR(S) | : Vollmer et al. |

It is certified that error appears in the above-identified patent and that said Letters Patent is hereby corrected as shown below:

In the Claims

In Claim 1, at Column 7, Line 40: "a PWM pulse width modulated" should read --a pulse width modulated--.

Signed and Sealed this
Tenth Day of October, 2023

Katherine Kelly Vidal
*Director of the United States Patent and Trademark Office*